Jan. 5, 1971  R. J. BELLIVEAU  3,552,193
MATERIAL TESTER WITH MODE INDICATOR
Filed Nov. 8, 1968  2 Sheets-Sheet 1

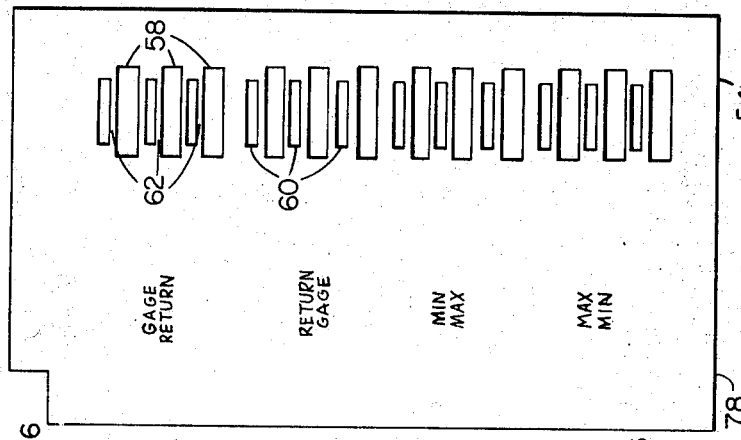
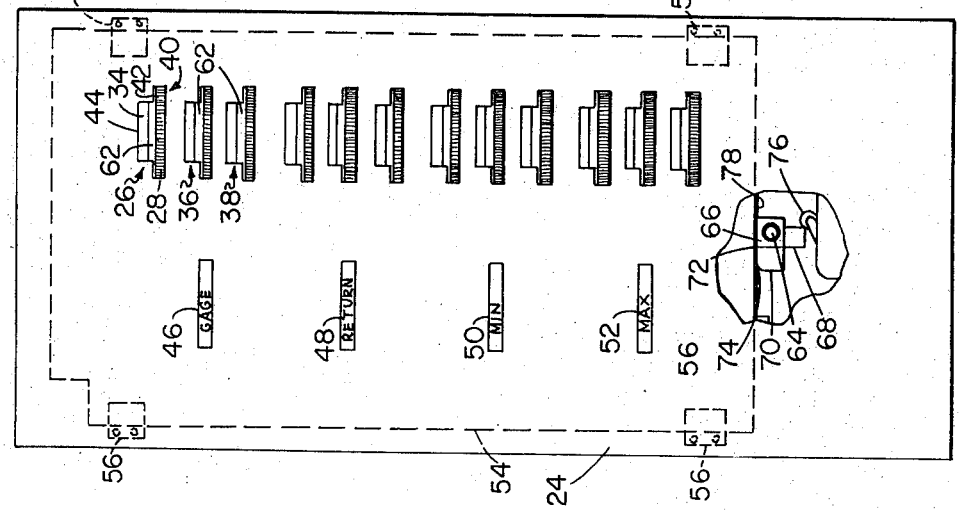
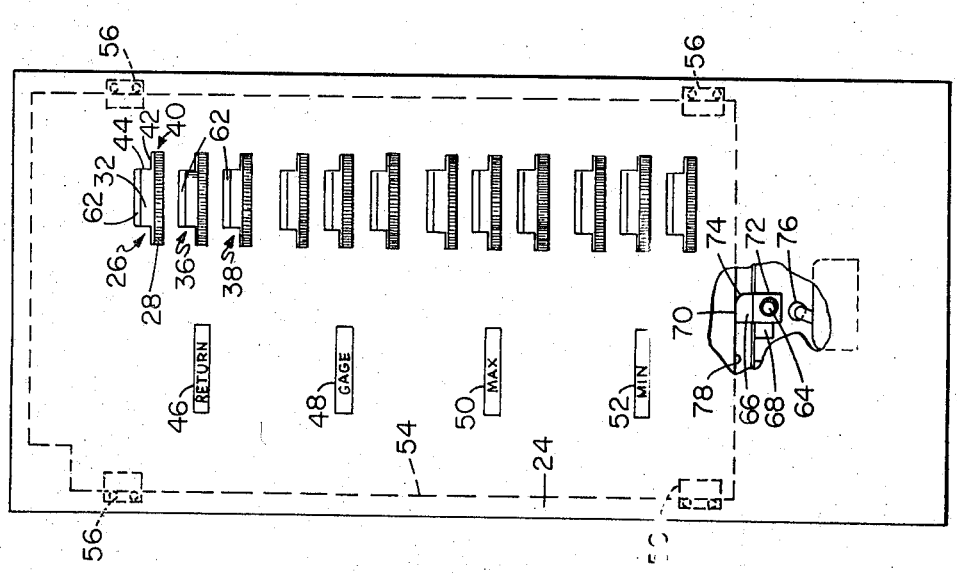

United States Patent Office 3,552,193
Patented Jan. 5, 1971

3,552,193
MATERIAL TESTER WITH MODE INDICATOR
Robert J. Belliveau, South Weymouth, Mass., assignor to Instron Corporation, Canton, Mass., a corporation of Massachusetts
Filed Nov. 8, 1968, Ser. No. 774,323
Int. Cl. G01n 3/08
U.S. Cl. 73—93                                8 Claims

ABSTRACT OF THE DISCLOSURE

Materials testing apparatus has a crosshead movable in opposite directions, respectively, during two modes of testing, control circuitry having an element with positions corresponding to each mode, separate indicia for each mode for indicating crosshead position, a shutter with two positions in each of which the indicia for the then operative mode are made visible and the indicia for the other mode are obscured, and selector mechanism for selecting the condition of the element and the position of the shutter.

---

This invention relates to materials testing apparatus having a movable crosshead.

Objects of the invention are to facilitate the coordination of control panel indicia and crosshead control circuitry with the particular mode of testing being employed, with apparatus that is simple, reliable, and easily manipulated and read without operator confusion.

The invention features materials testing apparatus having a crosshead movable in opposite directions respectively during two modes of testing, control circuitry having an element with first and second conditions respectively corresponding to the two modes, separate indicia for each mode for indicating crosshead position relative to a reference position fixed independently for each mode, a shutter having first and second positions in each of which the indicia for the then operative mode are made visible and the indicia for the other mode are obscured, and selector mechanism for selecting the condition of the element and the position of the shutter. In preferred embodiments additional separate indicia for each mode indicate crosshead position relative to a second reference position fixed independently for each mode, the reference positions for one mode being spaced from each other in one direction, while the reference positions for the other mode are spaced from each other in the opposite direction, the shutter having portions adapted to expose indicia relating to the first and second reference positions of one mode when the shutter is in its first position and to expose indicia relating to the first and second reference positions of the other mode when the shutter is in its second position; the shutter is mounted behind a display panel having windows adjacent to the indicia for exhibition of legends identifying the reference positions, the shutter carrying the legends located so that in each shutter position the legend adjacent to each indicium identifies the reference position to which the indicium relates; the selector mechanism comprises a cam mounted on a shaft for rotation between two positions, the shutter having an operating edge and the cam having a first flat surface cooperating with the operating edge to definitely locate the shutter in its first position when the cam is in its first position, a second flat surface spaced from the shaft by a distance greater than the corresponding spacing of the first surface, the second surface cooperating with the operating edge to definitely locate the shutter in its second position when the cam is in its second position, and a curved surface intermediate and joining the flat surfaces; the control circuitry includes a switch, and a second cam is mounted on the shaft adjacent to the switch for controlling its position in accordance with the operating modes; additional separate indicia indicate crosshead position relative to third and fourth reference positions, the third and fourth reference positions being spaced from each other in one direction for one mode of operation and being spaced from each other in the opposite direction for the other mode of operation, the shutter having portions adapted to expose the indicia relating to the third and fourth reference positions of one mode when the shutter is in its first position and to expose the indicia relating to the third and fourth reference positions of the other mode when the shutter is in its second position; the indicia are carried on dials, each dial carrying indicia for both modes; and the legends relating to the reference positions are spaced from each other in the same direction as the reference positions are spaced from each other for each mode.

Other objects, features, and advantages will appear from the following description of a preferred embodiment of the invention, taken together with the attached drawings thereof, in which:

FIGS. 3 and 4 are partially cross-sectional views of the control panel of said apparatus with the shutter in its different positions; and FIG. 5 is a front elevation of the shutter itself.

Figure 1:
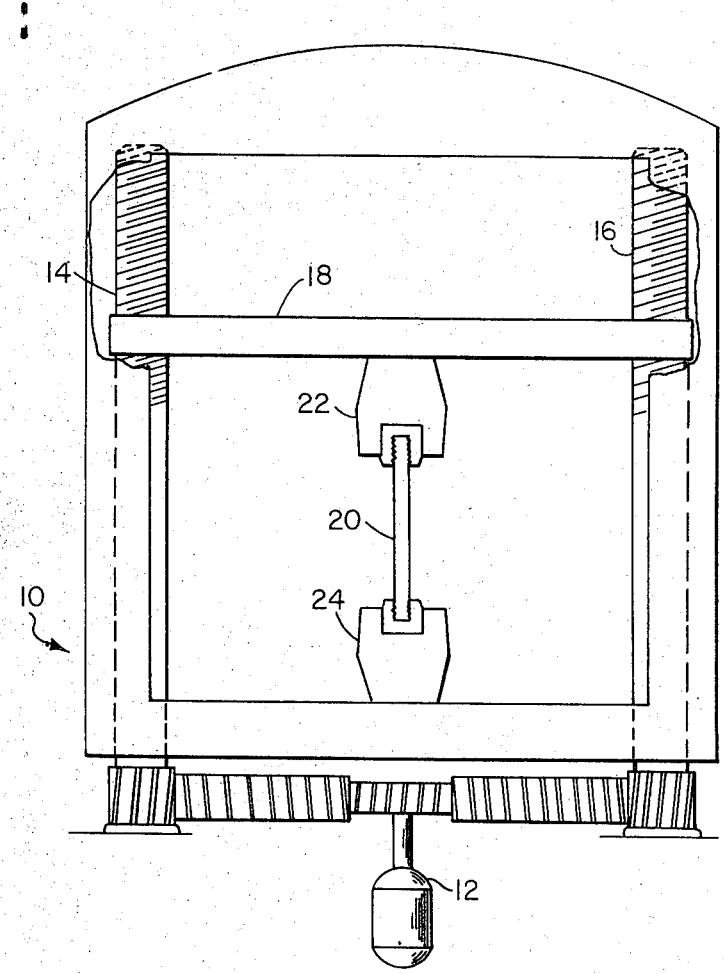
FIG. 1 is a front elevation partially broken away of a portion of materials testing apparatus of the type to which the invention is related.

FIG. 1 shows a portion of materials testing apparatus 10 of a known type in which motor 12 drives threaded shafts 14 and 16 to move crosshead 18 up or down for application of tensile or compressive loads to test specimen 20 held by jaws 22 and 24. In a testing cycle crosshead 18 moves from an initial reference position (gage length) to the position (return point) at which the desired elongation or compression of specimen 20 is reached, and then returns to the gage length position. For extension cycling the crosshead oscillates between two reference positions (maximum and minimum) intermediate gage length and return point.

Referring to FIGS. 3 and 4, twelve indicating dials (driven by standard mechanical linkages not shown) behind display panel 24 indicate cross head position relative to the gage length, return point, maximum and minimum reference positions associated with a given testing mode (tensile in FIG. 3, compressive in FIG. 4).

Figure 2:
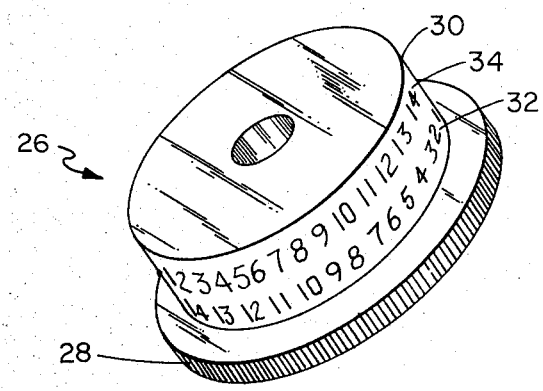
FIG. 2 is an isometric view of a dial thereof.

Considering a typical dial 26 (FIG. 2), it has a knurled operating portion 28 and a reduced diameter indicating portion 30 carrying a row 32 of numerals for use during tensile testing and, above row 32, a row 34 of numerals for use during compressive testing. Additional dials 36 and 38 are provided for each reference position, each giving a reading to an additional significant figure.

Panel 24 has windows 40 each having a lower rectangular portion 42, which accommodates dial operating portion 28, and a narrower upper rectangular portion 44 in front of indicating portion 30. Rectangular windows 46, 48, 50, and 52 in panel 24 are respectively adjacent to each set of dials 26, 36, and 38.

Shutter 54 (FIG. 5) is mounted between slides 56 on the rear of panel 24 and has twelve lower windows 58 (for accommodation of dial operating portions 28 and exposure of the lower rows of numerals on dial indicating portions 30) separated respectively from twelve upper windows 60 (for exposure of the upper rows of numerals on dial indicating portions 30) by shutter portions 62. Shutter 54 carries adjacent to each set of three windows 58 a pair of legends denoting respectively the two reference positions to which the dials corresponding to the particular windows 58 relate in the two testing modes.

Shaft 64 rotatably mounted below shutter 54, carries cams 66 and 68 having their longitudinal axes perpendicular to each other.

Cam 66 has a pair of perpendicular flat surfaces 70 and 72 (the latter being closer to the axis of shaft 64 than the former) separated from each other by smoothly curved surface 74. Cam 68 is located adjacent to microswitch 76 which is connected to control circuitry (not shown) for the crosshead. The two positions of switch 76 respectively correspond to the tensile and compressive modes of crosshead movement.

In operation, for tensile testing, shaft 64 is rotated so that cam 68 is out of contact with switch 76 (thereby coordinating the control circuitry with the tensile mode) and surface 70 of cam 66 supports shutter 54 in its upper position by its bottom edge 78. Shutter portions 62 obscure the upper rows (e.g., 34) of numerals on the dials and windows 58 expose the lower rows (e.g., 32) of numerals. Legends "RETURN," "GAGE," "MAX," and "MIN" respectively appear in windows 46, 48, 50, and 52, the relative vertical orientation of those legends (and of the sets of dials instantaneously corresponding thereto) being the same as the relative vertical orientation of the respectively denoted reference positions of the crosshead. The three dials adjacent to "GAGE" are set to zero and the "RETURN" (and, if desired, "MAX" and "MIN") dials are set to the desired values. The test is then carried out.

For compressive testing shaft 64 is rotated so that cam 68 engages switch 76 (thereby coordinating the control circuitry with the tensile mode) and surface 72 of cam 66 supports shutter 54 in its lower position. Shutter portions 62 obscure the lower rows (e.g., 32) of numerals on the dials, and windows 60 expose the upper rows (e.g., 34) of numerals. Legends "GAGE," "RETURN," "MIN," and "MAX" respectively appear in windows 46, 48, 50, and 52, the relative vertical orientation of those legends (and of the sets of dials instantaneously corresponding thereto) being the same as the relative vertical orientation of the respectively denoted reference positions of the crosshead. The dials are set as desired and the test is carried out.

Other embodiments will occur to those skilled in the art and are within the following claims.

What is claimed is:

1. Materials testing apparatus having
   a cross head movable in opposite directions respectively during two modes of testing,
   a driver connected to said crosshead to produce movement of said crosshead in said opposite directions,
   control circuitry effectively connected to said driver to control said movement, said circuitry including an element having first and second conditions respectively corresponding to said two modes,
   a display assembly mounted in said apparatus and carrying separate indicia for each mode for indicating crosshead position relative to first reference positions fixed independently for each mode,
   said display assembly including a shutter having first and second positions in each of which the indicia for the then operative mode are made visible and the indicia for the other mode are obscured, and
   selector mechanism, at least a portion of which is mounted adjacent said shutter, for selecting the condition of said element and the position of said shutter.

2. The apparatus of claim 1 further comprising additional separate indicia for each mode for indicating crosshead position relative to a second reference position fixed independently for each mode, said reference positions for one mode being spaced from each other in one direction, said reference positions for the other mode being spaced from each other in the opposite direction, said shutter having portions adapted to expose indicia relating to said first and second reference positions for one said mode when said shutter is in its first position and to expose indicia relating to said first and second reference positions for the other said mode when said shutter is in its second position.

3. The apparatus of claim 2 wherein a display panel is mounted in front of said shutter, said display panel having windows adjacent to said indicia for exhibition of legends identifying said reference positions, said shutter carrying said legends located so that in each shutter position the legend adjacent to each indicium identifies the reference position to which said indicium relates.

4. The apparatus of claim 2 further comprising additional separate indicia for each mode for indicating crosshead position relative to third and fourth reference positions, said third and fourth reference positions for one mode being spaced from each other in one direction, said third and fourth reference positions for the other mode being spaced from each other in the opposite direction, said shutter having portions adapted to expose said indicia relating to said third and fourth reference positions for one said mode when said shutter is in its first position and to expose said indicia relating to said third and fourth reference positions for the other said mode when said shutter is in its second position.

5. The apparatus of claim 2 wherein for each said mode said indicia respectively relating to said first and second reference positions are spaced from each other in the same direction as said reference positions are spaced from each other.

6. The apparatus of claim 1 wherein said selector mechanism comprises a cam mounted on a shaft for rotation between two positions, said shutter having an operating edge, said cam having
   a first flat surface cooperating with said edge when said cam is in its first position to definitely locate said shutter in its said first position,
   a second flat surface spaced from said shaft by a distance greater than the corresponding spacing of said first surface, said second surface cooperating with said edge when said cam is in its second position to definitely locate said shutter in its second position, and
   a curved surface intermediate and smoothly joining said flat surfaces.

7. The apparatus of claim 6 wherein said circuitry includes a switch having a first portion for coordinating said circuitry with a first said mode and a second portion for coordinating said circuitry with a second said mode, and a second cam is mounted on said shaft adjacent said switch for controlling its position in accordance with said modes.

8. The apparatus of claim 1 wherein dials are provided carrying said indicia, each said dial carrying indicia for both modes.

References Cited

UNITED STATES PATENTS 3,374,665    3/1968    Preston _____ 73—90

JERRY W. MYRACLE, Primary Examiner

U.S. Cl. X.R.

73—90